July 17, 1956 H. A. SWITZER 2,754,995
BATCHING MECHANISM
Filed March 12, 1954
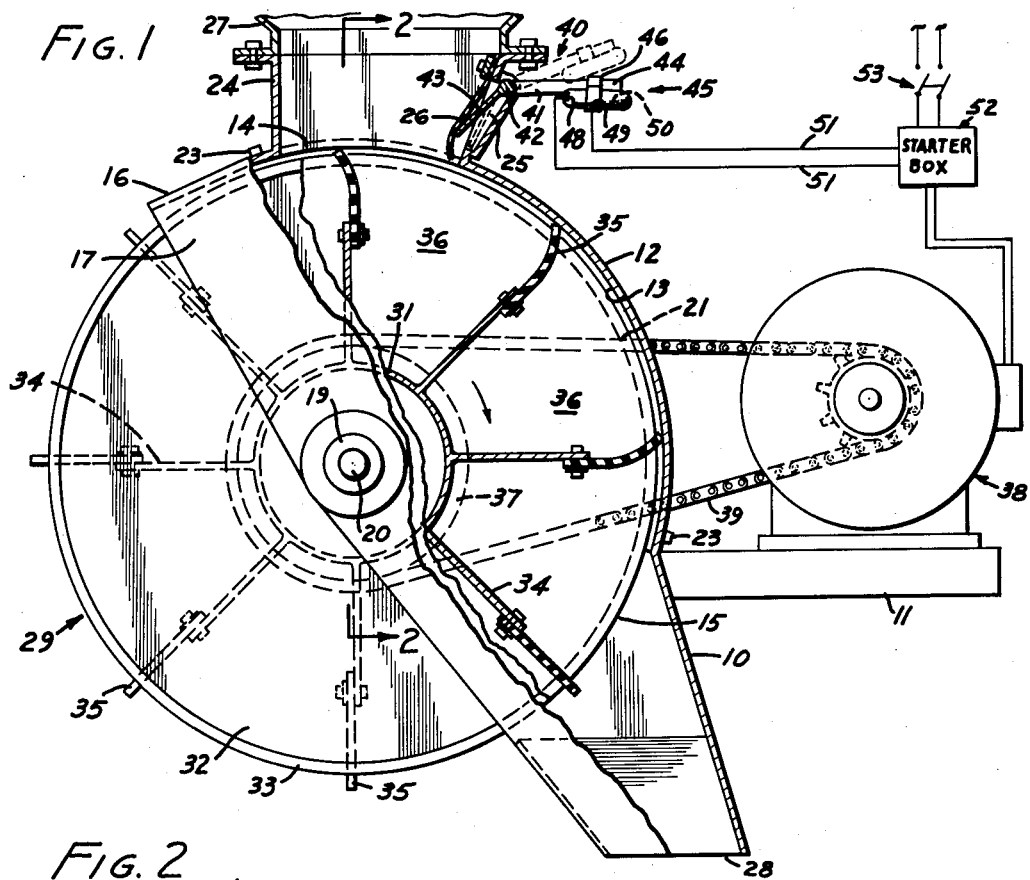
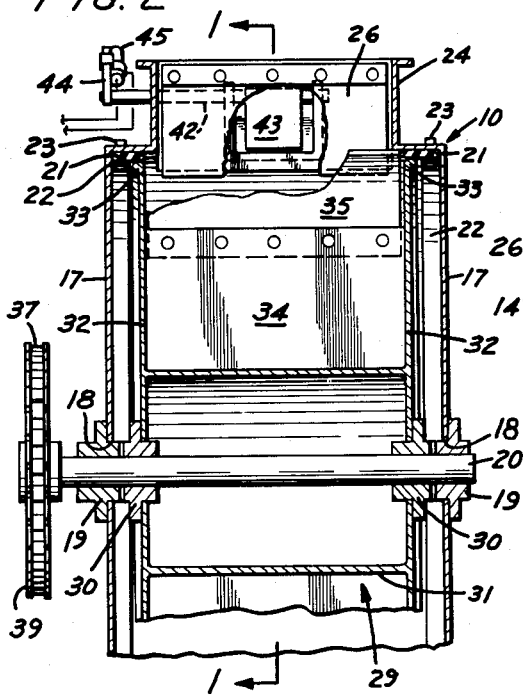
INVENTOR.
HOWARD A. SWITZER
BY
D. Gordon Angus
ATTORNEY.

United States Patent Office 2,754,995
Patented July 17, 1956

2,754,995
BATCHING MECHANISM
Howard A. Switzer, Pasadena, Calif.
Application March 12, 1954, Serial No. 415,790
3 Claims. (Cl. 222—63)

This invention relates to improvements in measuring devices which utilize batching wheels.

Industrial installations which use measured quantities of dry materials have need for a measuring device which can be operated continuously, and which can rapidly provide accurately measured quantities with the least possible handling of the material being measured. A batching wheel potentially possesses these necessary attributes, but has not been extensively used in the handling of dusty materials or aggregates of significant size, largely because such a wheel is apt to be rendered inaccurate or inoperative by the material. For instance, in handling cement, the fine powder has often sifted into operating parts and prevented their proper action, while rock aggregates and the like often jam between moving and stationary parts.

Accordingly it is an object of this invention to provide improvements for measuring devices utilizing batching wheels which make these devices more reliable and accurate than has previously been possible, and less likely to jam or clog up.

This invention is carried out in a batch measuring device having a case with an inlet and an outlet therethrough for admitting and discharging material, respectively, and a batching wheel inside the case. The batching wheel has measuring cavities on its outer periphery next to the casing which alternately register with the inlet and the outlet. Interrupter means may, if desired, be provided for stopping the batching wheel when material to be measured is not present in the inlet.

A feature of the invention resides in the provision of flexible wipers at some of the edges of the measuring cavity which will bend to pass an object of inconvenient size, and thereby will reduce the tendency of a batching wheel to jam such an object between the wheel and the case.

An additional feature resides in the provisions of flexible gasket means which extend between the case and the circumferentially directed edges of the cavity, making a sliding contact therebetween to confine the material to the measuring cavities.

An optional feature resides in a flexible shield for covering the interrupter means, if they are used in the measuring device, to substantially exclude material from such means.

The above and other features of the invention will be fully understood from the following detailed description and the accompanying drawings, of which:

Fig. 1 is a side elevation, partly in cross-section, of a batch-measuring device incorporating the invention;

Fig. 2 is a view partly in section, taken at line 2—2 of Fig. 1;

Fig. 3 is an enlarged view of a fragment of Fig. 1, also partly in cross-section.

Referring to the drawings, there is shown a batch measuring device having a case 10 mounted on a base 11. This case comprises a cap section 12 having an inner concave surface 13 which has a radius of curvature and is preferably a fragment of a cylinder although it may also have other curved shapes. The cap section also has a material inlet 14 and a material outlet 15 angularly spaced from each other around, and piercing, the cap section, and a tangent section 16 adjacent the inlet. End plates 17 are joined to the ends of the cap and tangent sections by means such as welding. Aligned holes 18 in the end plates hold bearings 19 in which a drive shaft 20 is journaled.

A gasket 21 comprising a strip of flexible material which may be rubber, is secured inside the case at the circumferential edges of the inner concave surface 13 by retention strips 22 held by bolts 23. These gaskets extend around the curved cap section from the inlet to the outlet.

A hopper 24 is formed integrally with the case and connects with the inlet. A recess 25 within and at one side of the inlet is covered with a shield 26. The shield is attached to the hopper wall above the recess so it hangs down over the recess as a flap. This shield is made of flexible material such as a $3/16''$ sheet of rubber, and is loose at its bottom edge. A chute 27 dumps material 27a into the hopper, and a discharge chute 28 depends from the outlet.

A batching wheel 29 fits within the case and is fixed to the drive shaft by means of hubs 30. The drive shaft is therefore the central axis of the wheel, and this shaft also lies on the central axis of the concave surface 13. The wheel has a central, axial cylinder 31 extending between two flanges 32, the flanges being attached to the hubs so as to turn with them. A smooth metal bead 33 welded to the outer circumference of each flange makes a sliding contact with the gaskets 21 to form sealing means.

Stiff metal vanes 34 are attached to the cylinder and to the flanges by means such as welding and extend radially away from the cylinder. These vanes terminate short of the case. Flexible wipers 35, which may be of $1/2''$ sheet rubber, are fastened to the outer edge of the vanes, and, when unflexed, extend to a radial distance from the center of the drive shaft greater than the radius of concave surface 13, and therefore can make contact with the case. These wipers are conveniently fastened to the vanes by bolt means.

Measuring cavities 36 are thus formed between the case, the vanes and wipers, the cylinder, and the flanges. These cavities may be of any desired size. The boundaries of the cavity which contact the casing are the wipers, which extend substantially parallel to the wheel's central axis to form axial edges, and the beads and gaskets, which extend circumferentially around the wheel's axis to form circumferential cavity edges.

The drive shaft has a sprocket 37 on one end which is driven by an electric motor 38 through a chain 39. The motor may conveniently be attached to the base 11.

Interrupter means 40 are partially disposed in the recess 25. These means comprise a bell crank 41 having a shaft 42 journaled to the hopper. One arm 43 is a plate pivotally movable in the recess, so disposed that it is in contact with the shield 26. The other arm 44 extends away from the hopper outside the recess and has a mercury switch 45 attached thereto by a strap 46. The switch is a mercury switch for convenience. Some other type of switch could be used. The mercury switch comprises a container 47 enclosing two electrodes 48, 49 and a quantity of mercury 50. Two extreme positions of arm 44 are shown in solid and phantom line in Fig. 1.

Electrical leads 51 connect the electrodes 48, 49 to a motor starter box 52 of conventional manufacture. A master switch 53 is placed in a main power circuit which leads to the starter box. The starter box is connected in the circuit so that the motor will start or continue in operation only when the master switch is closed and the circuit through the mercury switch is completed.

In operation the master switch is first closed to apply an electrical potential to the starter box. When the interrupter means 40 are in the position shown by solid line in Fig. 1, the motor will not start, for the arm 44 is in its lower position, and the mercury does not submerge both electrodes 48, 49 to make a complete circuit. Therefore, the electrical continuity in the starter box is broken. The interrupter means assume this position when there is no material in the hopper to press against shield 26 and thereby lower arm 43 to elevate arm 44.

When material to be measured is dumped into the hopper, the shield and arm 43 are pressed down by the weight of the material and the mercury switch is tilted by the raising of arm 44, as shown in Fig. 3. This causes the mercury to submerge both of the electrodes, and the power circuit is complete in the starting box, so that the motor begins to operate and turn the wheel. Operation will continue as long as the material bears against the shield and the master switch is closed. Should the hopper again become empty the arm 44 will fall and the power circuit will be broken. To stop the wheel from coasting after such an event, the motor may be provided with a magnetic brake, if desired.

It will be appreciated that the shield 26 keeps the material out of the recess 25 and away from the arm 43. The weight of the excluded material exerts the necessary force. Since the shield acts as a flap, it does not materially impede the rise of arm 43 when there is insufficient material in the hopper to press the shield against it.

When the power circuit is closed and the motor operates, the sprocket is turned by the chain 39, and the batching wheel is rotated in a clockwise sense as shown in Fig. 1. The rotation of the wheel causes the measuring cavities to register successively with the inlet and the outlet.

As a vane approaches the tangent section, the wiper stands straight and radially outward. This wiper is first bent back by contact with the tangent section 16, and later by contact with the cap section 12. As a given cavity sweeps under the inlet, material drops into it until the cavity is filled. After being filled, the cavity sweeps along the cap section until it reaches the outlet, where it drops the contents into chute 28. During the time the cavity passes from inlet to outlet, its bounding wipers make a continuous contact with the cap section to hold the material inside the cavity.

In the event that a large piece of rock or some other object of inconvenient size becomes lodged between the edge of the cap section and a vane or wiper, this wheel will not become jammed, since the wiper will simply bend back further so as to pass by the object, which drops into the next cavity.

The gasket 21 makes continuous contact with the bead 33. This sealing means also keeps the material inside the cavities, a particularly important feature when a cavity is full and moving in a downward direction toward the outlet, since leakage from a full cavity involves an inaccuracy in the amount delivered to the chute. These sealing means could also be provided, if desired, by applying the bead to the case and attaching the flexible gasket to the wheel. The failure to provide effective means for such sealing in previous batching wheels has permitted material to leak out the sides, thereby clogging the mechanism and rendering the wheel inoperative as well as inaccurate.

If the wheel rotates where there is insufficient material in the hopper to fill the cavities, the wheel will "lose count" by producing unfilled or partially filled batches. When interrupter means are provided to avoid this risk, such means must themselves be kept free of the material so that the arm 43 can lift to drop the arm 44 and open the mercury switch, as well as to allow the arm 43 to move downward. If material gets into the recess, the freedom of movement is impaired. The shield 26 furnishes the necessary protection. It is a simple device for such a purpose, and uses the weight of the material to be excluded as the force for making the sealing means fit snugly.

These improvements thus enable a batching wheel to be used in a reliable measuring device which has no inherent tendency to jam, clog or spill, and which will operate to deliver full and accurately measured batches of material. It will be appreciated that these improvements are useful in batching wheels which measure other than dry or lumpy materials, the materials to be measured not being a limitation on the usefulness of the improvements. Therefore this invention is not to be limited to the embodiments shown in the drawings and described in the description, which are given by way of example and not of limitation, but only in accordance with the scope of the appended claims.

I claim:

1. A batch measuring device comprising: a case having an inlet, an outlet, and a concave inner contact surface between said inlet and outlet having a center of curvature; a measuring wheel rotatable around a central axis, said central axis and center of curvature being coincident, and having batch-measuring cavities in its periphery, said cavities having axial edges extending generally parallel to the central axis of the wheel, and circumferential edges extending around said central axis, each of said cavities alternately registering with the inlet and the outlet as the wheel rotates; flexible wipers affixed to the wheel at the axial edges of the cavities for making a resilient sliding seal between the measuring wheel and the contact surface; a flexible seal between the case and said circumferential edges of the cavities; driving means for rotating the wheel; a hopper interconnecting with the inlet for discharging material into the cavities; a non-horizontal wall in said hopper having an opening therein; a flexible flap fixed to said hopper wall above said wall opening and hanging freely to cover said opening; and means for stopping rotation of the wheel by the driving means when material is not present in the hopper comprising a counterweighted arm pivotally mounted in said wall opening adapted to be swung upwardly and inwardly into said hopper when not forced downwardly and outwardly by weight of material against said flexible flap, and switch means connected to the driving means and actuated in response to the position of said arm to interrupt the driving means when material is not present in the hopper.

2. Apparatus according to claim 1 in which the counterweighted arm is counterweighted by a second arm attached thereto, whereby both arms are pivotally mounted, and in which said switch means comprise a container, two electrodes within the container, and a quantity of liquid mercury in said container, said switch means being mounted on said second arm, whereby the container is tilted by pivoting of the arms by the weight of material in the hopper against the flap to submerge both electrodes in the mercury and permit an electric current to flow therethrough and operate the driving means, and whereby the switch is tilted by the arms so that the mercury does not submerge both electrodes when material in the hopper does not bear against the flexible flap to force down the counterweighted arm, thereby preventing current flow through the switch and stopping the driving means.

3. Apparatus according to claim 1 in which the non-horizontal wall of the hopper is also non-perpendicular and faces upward so that material in the hopper exerts a downward component of force on the flexible flap.

References Cited in the file of this patent

UNITED STATES PATENTS

| | | |
|---|---|---|
| 2,276,382 | Francis | Mar. 17, 1942 |
| 2,276,383 | Francis | Mar. 17, 1942 |
| 2,367,311 | Reece | Jan. 16, 1945 |
| 2,428,241 | Pootjes | Sept. 30, 1947 |
| 2,460,605 | Soissa | Feb. 1, 1949 |
| 2,530,181 | Schilling | Nov. 14, 1950 |
| 2,594,974 | Mylting | Apr. 29, 1952 |

FOREIGN PATENTS

| | | |
|---|---|---|
| 337,622 | Germany | June 3, 1921 |